United States Patent [19]

Taniguchi et al.

[11] Patent Number: 5,760,514
[45] Date of Patent: Jun. 2, 1998

[54] ASSEMBLY FOR ONE-WAY CLUTCH, WITH OUTER RING AND STATOR SHAPED SO AS TO REDUCE EFFECTS OF THERMAL SHRINKAGE

[75] Inventors: Toshio Taniguchi, Tondabayashi; Masanori Arima, Kashiwara; Masanobu Umezawa; Katsumi Sekine, both of Nihonmatsu, all of Japan

[73] Assignee: NOK Corporation & Koyo Seiko Co., Ltd., Tokyo, Japan

[21] Appl. No.: 738,163

[22] Filed: Oct. 25, 1996

[30] Foreign Application Priority Data

Oct. 27, 1995 [JP] Japan .................... 7-303894
Oct. 31, 1995 [JP] Japan .................... 7-305235

[51] Int. Cl.⁶ .................................................. F16D 41/06
[52] U.S. Cl. ............................ 310/92; 310/92; 310/90; 310/43; 192/45; 192/45.1; 192/41 R; 192/110 B; 384/564; 384/569; 384/571; 384/585
[58] Field of Search .................... 192/45, 45.1, 41 R, 192/110 B; 310/92, 90, 43; 154/100, 103; 384/564, 569, 571, 585

[56] References Cited

U.S. PATENT DOCUMENTS

| | | | |
|---|---|---|---|
| 4,660,698 | 4/1987 | Miura | 192/45 |
| 5,056,581 | 10/1991 | Tagawa et al. | 164/100 |
| 5,094,076 | 3/1992 | Henricks | 60/345 |
| 5,431,536 | 7/1995 | By et al. | 415/200 |
| 5,529,402 | 6/1996 | Murphy | 384/564 |

*Primary Examiner*—Thomas M. Dougherty
*Assistant Examiner*—Karl I.E. Tamai
*Attorney, Agent, or Firm*—Reid & Priest LLP

[57] ABSTRACT

The present invention is intended to provide a one-way clutch capable of preventing the inner circumferential surface of the outer ring of the one-way clutch from being deformed even when the outer ring of the one-way clutch for a stator constituting a torque converter is integrally formed with the stator made of plastic.

To attain the object, in the one-way clutch for the plastic stator, wherein the bearing support portion of the stator is integrally formed in the inner circumferential direction at or near one axial end of the boss portion of the stator and the outer ring is inserted in and formed on the inner circumferential side of the boss portion so as to be integrally held, the thickness of the outer ring on the side opposite to the bearing support portion is made smaller than that on the side of the bearing support portion, or the outer diameter of the outer ring is gradually decreased in the axial direction from the end of the outer ring on the side of the bearing support portion to the other end, or a ring-shaped step portion is provided at the other axial end on the outer circumferential surface of the outer ring so that the amount of thermal shrinkage at the plastic portion on the side of the bearing support portion of the stator is made almost equal to the thermal shrinkage at the plastic portion on the opposite side.

3 Claims, 4 Drawing Sheets

ASSEMBLY FOR ONE-WAY CLUTCH, WITH OUTER RING AND STATOR SHAPED SO AS TO REDUCE EFFECTS OF THERMAL SHRINKAGE

BACKGROUND OF THE INVENTION

The present invention relates to a one-way clutch for a torque converter or the like for an automatic transmission (AT), a kind of automobile power transmission mechanism, and more particularly to a one-way clutch requiring no after-processing of the inner diameter of the outer ring thereof.

In a torque converter for an automobile automatic transmission (AT), a pump impeller 15 is driven by the power from the engine, and a turbinerunner 13 is rotated via AT oil (automatic transmission oil) used as a medium liquid by using the stator 14 as shown in FIG. 8. The turbine runner 13 is secured to the flange portion 12 of the inner diameter portion, and an input shaft 11 is spline-fitted in the flange portion 12 so that rotation torque is transmitted from the pump impeller 15 to the input shaft 11. The outer ring 16a of a one-way clutch 16 is fitted in the stator 14, and the inner ring 16b of the one-way clutch 16 is spline-fitted in a shaft 17 secured to the stationary portion of the case. In this structure, the stator 14 can rotate in the same direction as that of the pump impeller 15, but cannot rotation in the opposite direction by virtue of the one-way clutch 16.

As shown in FIG. 7 the one-way clutch 16 comprises a steel outer ring 16a integrally formed with a plastic stator 14 having a bearing support portion 14b on one side of the boss portion 14a of the stator 14, a steel inner ring 16b spline-fitted in the shaft as described above, a plurality of sprags 19 used as engagement members disposed between the outer ring 16a and the inner ring 16b, an outer holder 18a and an inner holder 18b for holding the sprags 19, a spring 20 for pressing the sprags 19 in one direction, and a retainer 21 for hermetically sealing the ring-shaped space between the outer ring 16a and the inner ring 16b. The bearing support portion 14a is provided on the one side of the stator 14 instead of on both sides so as to be advantageous in reducing cost.

As described above, the outer ring 16a of the one-way clutch 16 is integrally formed with the plastic stator 14 during injection molding. However, as shown in FIG. 6, the outer ring 16a is deformed to the inner diameter side because of the shrinkage of the plastic, and the inner circumferential surface, which was straight and parallel with the axial line before shrinkage, is deformed. In other words, when the outer ring 16a is inserted in and formed with the outer ring 16a, integration molding is conducted at 175° to 200° C. When the temperature lowers to room temperature, the plastic portion shrinks. However, since the amount of plastic on the side of the bearing support portion 14b of the stator 14 is larger than that on the side of the ring-shaped retainer 21 of the outer ring 16a, the amount of shrinkage at the portion A of the outer ring 16a on the side of the bearing support portion 14b is larger than that at the portion B of the outer ring 16a on the side of the ring-shaped retainer 21. As a result, the inner circumferential surface of the outer ring 16a is deformed into a taper shape. However, the inner circumferential surface of the outer ring 16a must maintain accuracy since the surface is used as the raceway for the sprags 19. Therefore, after-processing such as grinding is required to correct the deformation of the inner circumferential surface of the outer ring 16a, thereby being disadvantageous in reducing cost.

SUMMARY OF THE INVENTION

The present invention is intended to solve the above-mentioned problems. An object of the present invention is to provide a one-way clutch capable of preventing the inner circumferential surface of the outer ring of the one-way clutch from being deformed even when the outer ring of the one-way clutch for a stator constituting a torque converter is integrally formed with the stator made of plastic.

In other words, the object of the present invention is to provide a one-way clutch for a plastic stator, wherein the bearing support portion of the stator is integrally formed in the inner circumferential direction at or near one axial end of the boss portion of the stator, and the outer ring is inserted and formed on the inner circumferential side of the boss portion so as to be integrally held, the one-way clutch being characterized in that the axial thickness of the outer ring on the opposite side of the bearing support portion is smaller than that of the outer ring on the side of the bearing support portion.

Furthermore, another object of the present invention is to provide a one-way clutch being characterized in that the outer diameter of the outer ring is gradually decreased in the axial direction from one end on the side of the bearing support portion to the other end.

A still another object of the present invention is to provide a one-way clutch having a ring-shaped step portion on the outer circumferential surface at the end of the outer ring on the opposite side of the bearing support portion.

Since the outer diameter of the outer ring is gradually decreased in the axial direction or the outer circumferential surface at the other axial end of the outer ring (on the side of the ring-shaped retainer) is provided with the ring-shaped step portion in the one-way clutch of the present invention, the other axial end of the outer ring is made thinner than the axial end (on the side of the bearing support portion). By appropriately setting the dimensional difference in thickness, the magnitude of stress generated inside the outer ring at the time of shrinkage of the plastic can be made nearly uniform along the entire length in the axial direction. Since the cylindrical outer ring is prevented from being deformed into a taper shape, the present invention can provide a one-way clutch superior in dimensional accuracy capable of satisfying the inner diameter allowance of the outer ring. Furthermore, in the one-way clutch according to each claim of the present invention, the inner circumferential surface of the outer ring integrally formed with the plastic stator is not required to be processed after the integration, whereby the production cost can be reduced.

DETAILED DESCRIPTION OF THE PREFERRED EMBODIMENTS

The embodiments of the present invention are described below referring to the accompanying drawings.

Figure 1:
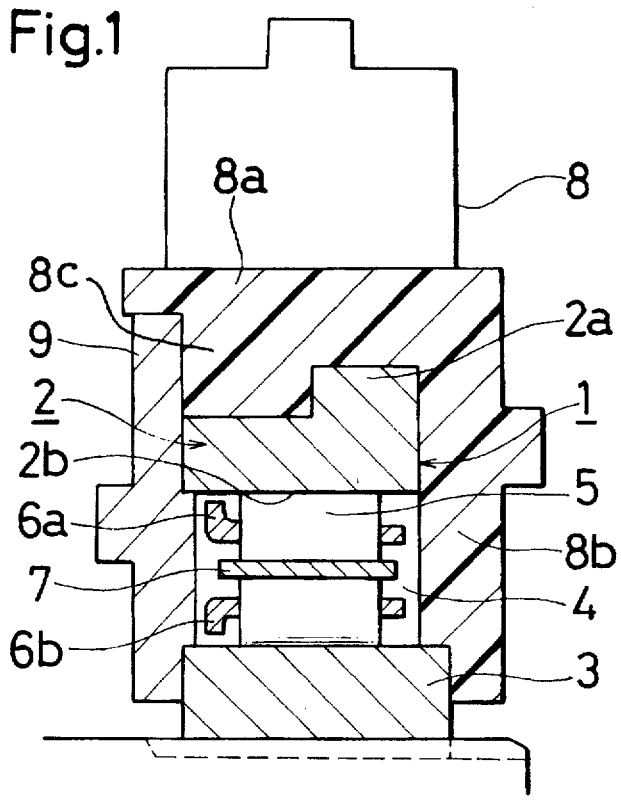
FIG. 1 is a partially vertical sectional view of a one-way clutch in accordance with the present invention.
Figure 2:
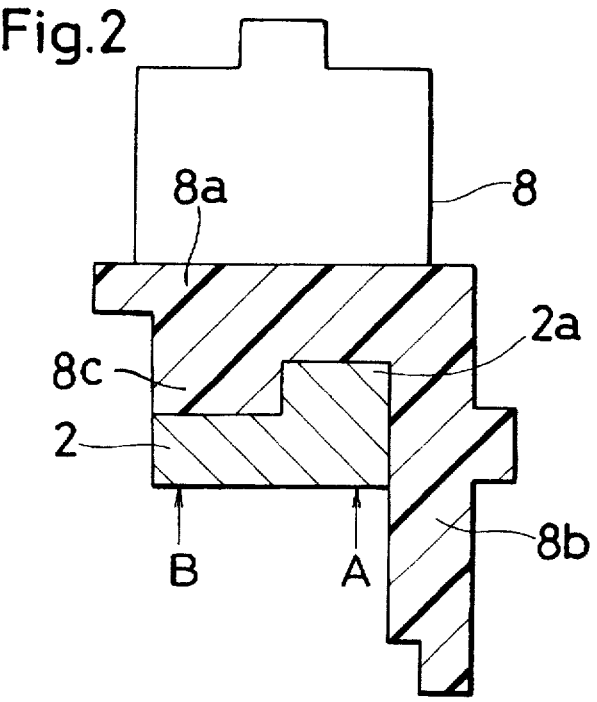
FIG. 2 is a vertical sectional view of the stator and the outer ring of the one-way clutch of the present invention.

As shown in FIG. 1, the one-way clutch 1 of the present invention comprises a steel outer ring 2 integrally formed with a plastic stator 8 which is also integrally formed with a bearing support portion 8b on one side of a boss portion 8a, a steel inner ring 3, sprags 5 used as engagement members disposed in the ring-shaped space 4 between the outer ring 2 and the inner ring 3, an outer holder 6a and an inner holder 6b for holding the sprags 5, a spring 7 for pressing the sprags 5 to one side (the side for locking the stator 8), and a ring-shaped retainer 9 for hermetically sealing one side of the ring-shaped space 4.

On one side of the stator 8, the bearing support portion 8b extends inward in the radial direction from the boss portion 8a and integrally formed. A rib portion 2a is formed on the outer circumferential surface of the outer ring 2 on the side of the bearing support portion 8b. In other words, a recessed step portion is formed on the outer circumferential surface of the outer ring 2 to make the thickness of the outer ring 2 smaller than the thickness on the side of the bearing support portion 8b in the axial direction from the side of the bearing support portion 8b to the side of the ring-shaped retainer 9 so that the amount of thermal shrinkage at the portion A of the outer ring 2 on the side of the bearing support portion 8b is made almost equal to the thermal shrinkage at the portion B of the outer ring 2 on the side of the ring-shaped retainer 9. With this structure, the difference between the amounts of deformation at the portions A and B on the inner circumferential surface 2b of the outer ring 2 can be minimized even if thermal shrinkage occurs when the outer ring 2 is inserted in and formed with the plastic boss portion 8a of the stator 8. As a result, the inner circumferential surface 2b of the outer ring 2 is almost free from taper deformation, and the straight surface being in parallel with the axial line can be maintained.

Figure 3:
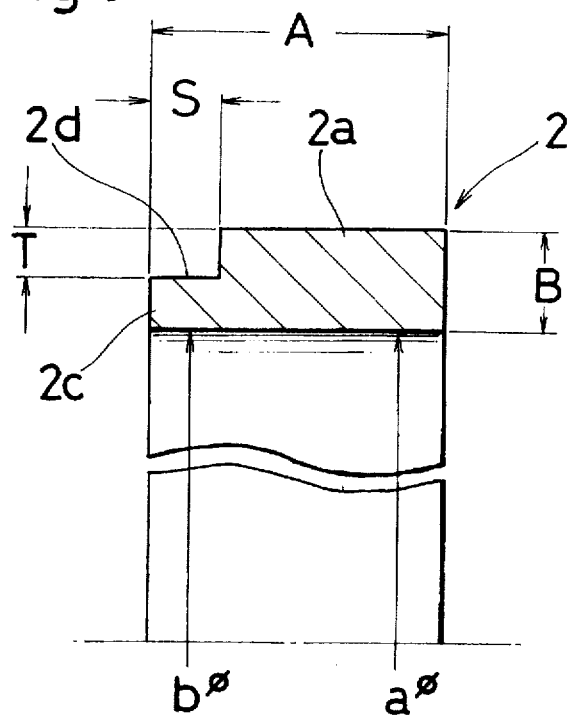
FIG. 3 is a partially sectional view of an outer ring inserted in, formed with and held by the stator of the one-way clutch of the present invention.

Next, the shapes and other features of the outer ring 2 are explained further. As shown in FIG. 3, since the rib portion 2a is formed on the outer circumferential surface of the outer ring 2 on the side of the bearing support portion 8b, a ring-shaped step portion 2d is eventually formed on the side of the other end 2c (on the side of the ring-shaped retainer 9). Since the step portion 2d is filled with plastic, the other end 8c of the boss portion 8a is made thicker by the amount of the plastic. Sample tests were conducted to find effects depending on the presence or absence of the rib portion 2a (or the step portion 2d) on the outer ring 2, and the results of the tests are described below.

The dimensional ratios of the portions of the outer ring 2 are listed in Table 1.

The results of the tests are shown in Table 2.

As being understood according to the results, satisfactory results can be obtained if the S/A ratio is 0.23 or more and the T/B ratio is 0.6. Particularly when the S/A ration is 0.45 or more and the T/B ratio is 0.6, dimensional accuracy can be satisfied completely.

In addition, instead of the structure provided with the ring-shaped step portion 2d on the outer circumferential surface of the outer ring 2 on the side of the other axial end 2c, the structures described below can also offer the nearly same effects as those of the first embodiment.

Figure 4:
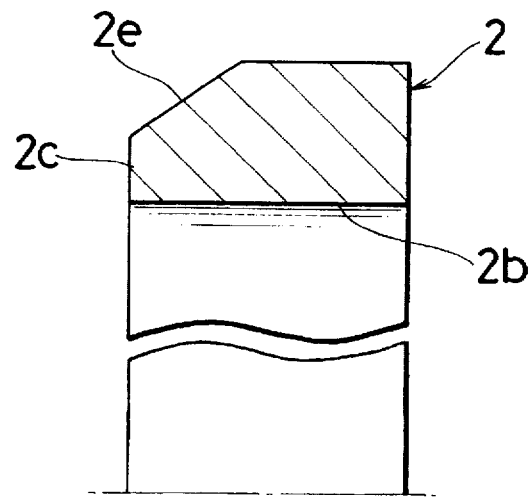
FIG. 4 is a sectional view of an outer ring in accordance with a second embodiment of the one-way clutch of the present invention.

FIG. 4 is a sectional view of an outer ring 2 in accordance with a second embodiment of the one-way clutch. As shown in this figure, a taper portion 2e, the diameter of which decreases gradually in the direction from an intermediate portion on the outer circumferential surface of the outer ring 2 to the ring-shaped retainer 9, is formed on the outer circumferential surface on the side of the other axial end 2c of the outer ring 2. The ring-shaped space newly formed by this taper portion 2e is filled with plastic, and the other axial end (on the side of the ring-shaped retainer 9) of the boss portion 2a is made thicker by the amount of the plastic.

Figure 5:
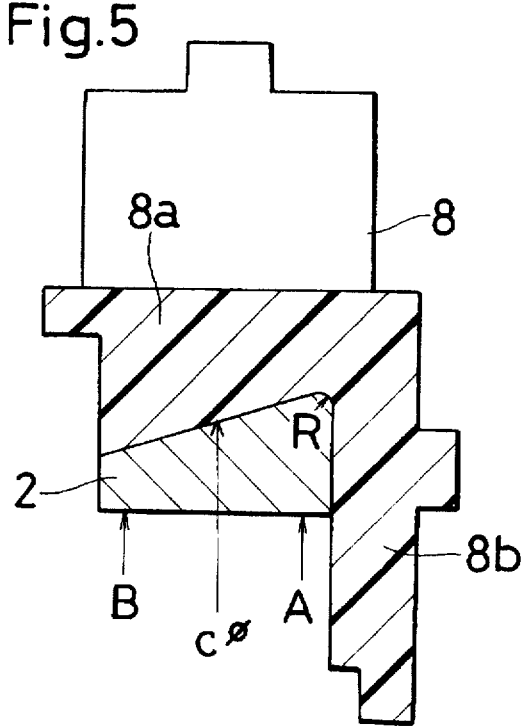
FIG. 5 is a sectional view of a stator and an outer ring in accordance with a third embodiment of the one-way clutch of the present invention.
Figure 6:
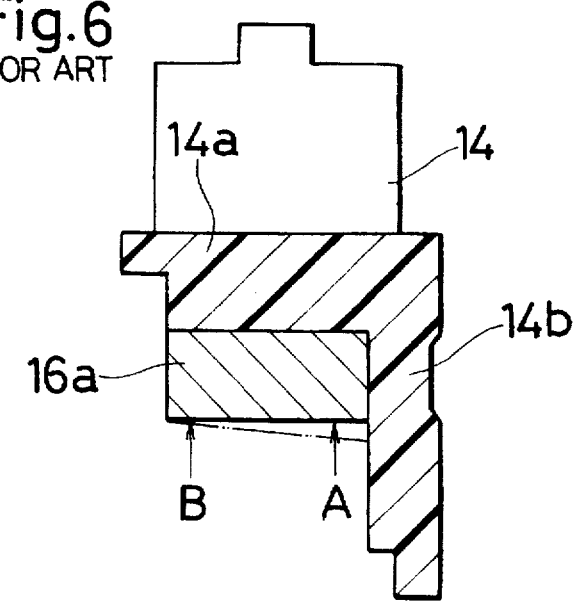
FIG. 6 is a vertical sectional view of the stator and the outer ring of a conventional one-way clutch.
Figure 7:
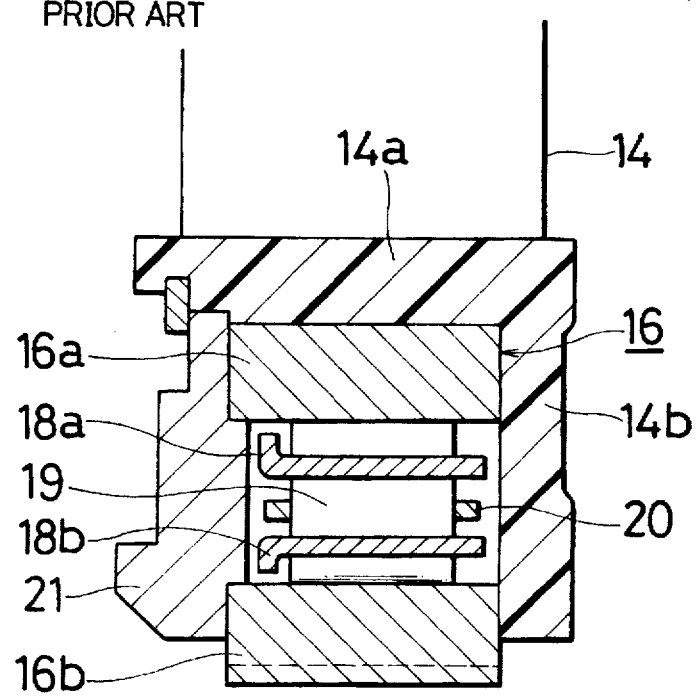
FIG. 7 is a partially sectional view of the conventional one-way clutch.
Figure 8:
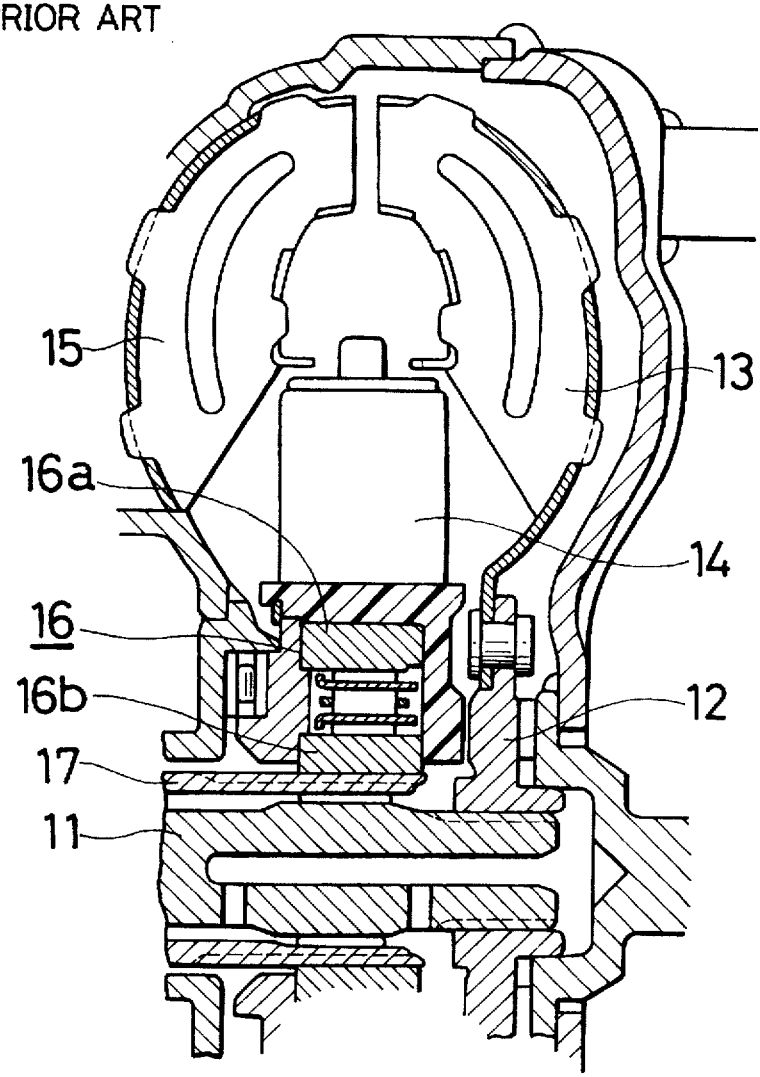
FIG. 8 is a partially sectional view of a conventional torque converter.

FIG. 5 is a sectional view of a stator and an outer ring in accordance with a third embodiment of the one-way clutch of the present invention.

This embodiment is described below. As described above, the outer ring 2 integrally formed with the plastic stator 8 is provided with a rib portion 2a on the outer circumferential surface thereof on the side of the bearing support portion 8b. However, as shown in this figure, the outer circumferential surface of the outer ring 2 integrally formed with the plastic stator 8 may be provided with a taper having diameter cφ which decreases gradually in the axial direction from the side of the bearing support portion 8b to the side of the ring-shaped retainer 9. With this structure, the amount of thermal shrinkage of the plastic at the portion A on the side of the bearing support portion 8b can be made almost equal to that at the portion B on the side of the ring-shaped retainer 9. It is desirable that a circular arc portion R is provided at the end corner on the side of the bearing support portion 8b having the maximum diameter of the outer ring 2 so as to prevent stress concentration.

In accordance with the first, second and third embodiments of the one-way clutch of the of the present invention, since the outer diameter of the outer ring 2 is gradually decreased in the axial direction from the side of the bearing support portion 8b of the stator 8 to the side of the ring-shaped retainer 9, the wall thickness of the stator 8 on the side of the ring-shaped retainer 9 is made larger, whereby the outer ring 2 fitted in the stator 8 is prevented from coming out in the axial direction.

Since the outer diameter cφ of the outer ring 2 is gradually decreased or the ring-shaped step portion 2d is provided on the outer circumferential surface at the other axial end (on the side of the ring-shaped retainer) of the outer ring 2 in the one-way clutch of the present invention as described above in detail, the outer ring 2 at the other axial end is made thinner than the one axial end (on the side of the bearing support portion). By appropriately setting the dimensional difference in thickness, the magnitude of the stress generating inside the outer ring at the time of the shrinkage of the plastic can be made nearly uniform along the entire length in the axial direction. Since the cylindrical outer ring can thus be prevented from being deformed into a taper shape, the present invention can provide a one-way clutch superior in dimensional accuracy capable of satisfying the inner diameter allowance of the outer ring.

Moreover, in the one-way clutch according to each claim of the present invention, the inner circumferential surface of the outer ring integrally formed with the plastic stator is not required to be processed after the integration, whereby the production cost can be reduced.

TABLE 1

|  | S/A | T/B |
|---|---|---|
| Sample No. 1 | 0 | 0 |
| Sample No. 2 | 0.23 | 0.6 |
| Sample No. 3 | 0.45 | 0.6 |

Note 1 A: The axial length of the outer ring 2
S: The axial length of the step portion 2d
B: The thickness of the outer ring 2 (length in the radial direction)
T: The thickness of the step portion 2d (length in the radial direction)
a&U: The inner diameter of one axial end of the outer ring 2 after shrinkage
b&U: The inner diameter of the other axial end of the outer ring 2 after shrinkage
Note 2 Sample No. 1 has no step portion 2d.

TABLE 2

| Sample No. 1 | a$\phi$–b$\phi$ (mm) |
|---|---|
| Sample No. 2 | –0.009 |
| Sample No. 3 | –0.00 |

Note 1 The result of sample No. 1 is the average of the data on ten test pieces (Max. 0.013 to Min. 0.008).
Note 2 The result of sample No. 2 is the average of the data on five test pieces (Max. 0.005 to Min. 0.00).
Note 3 The result of sample No. 3 is the average of the data on five test pieces (Max. 0.001 to Min. 0.00).

What is claimed is:

1. An assembly in a one-way clutch, the assembly comprising:

a) a plastic stator including:
      1) a boss portion; and
      2) a bearing support, integrally formed in an inner circumferential direction of the boss, at or near an axial end of the boss; and b) an outer ring, inserted and formed on the inner circumferential surface of the boss so that the outer ring is integrally held by the boss, the outer ring having:
      1) an inner circumferential surface that is straight and parallel to an axial line of the one-way clutch; and
      2) an outer circumferential surface that, relative to the inner circumferential surface, defines a thickness of the outer ring;

wherein the thickness of the outer ring at a first end axially opposite the bearing support is smaller than the thickness of the outer ring at a second end axially adjacent the bearing support, throughout the entire circumference of the outer ring.

2. The assembly of claim 1, herein:

a diameter of the entire outer circumferential surface of the outer ring gradually decreases with increasing axial distance from the second end of the outer ring.

3. The assembly of claim 1, wherein:

the outer circumferential surface of the outer ring's first end is formed with a ring-shaped step.

* * * * *